Oct. 23, 1951 V. GOODWIN, JR 2,572,023
COAXIAL CONTROL KNOB
Filed March 22, 1949
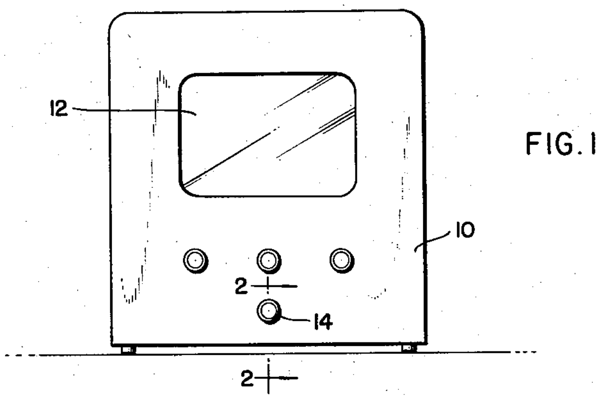
FIG. 1
FIG. 2
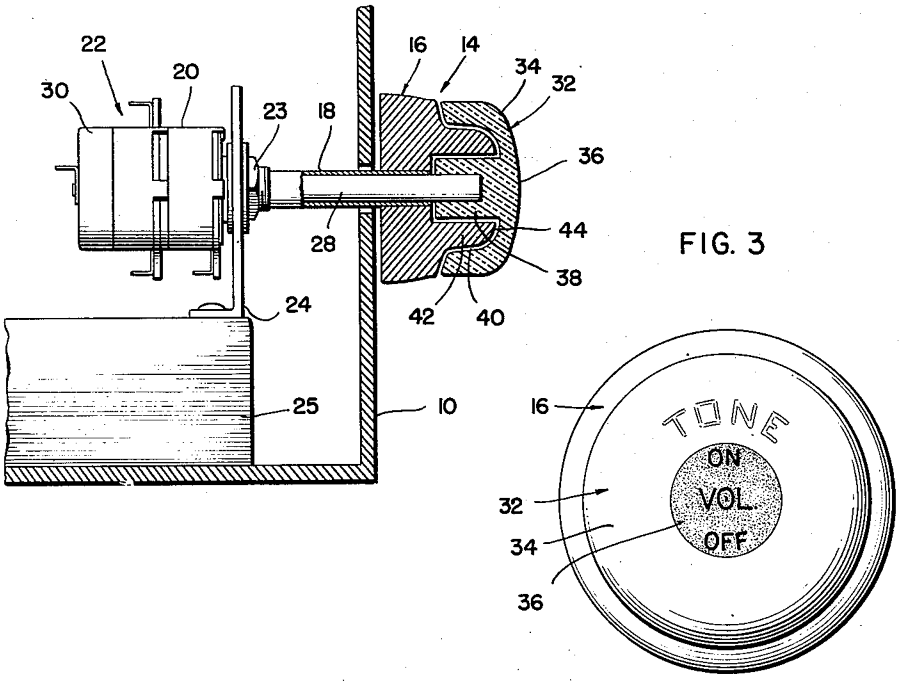
FIG. 2, FIG. 3
*INVENTOR.*
VERNON GOODWIN, JR.
*BY* Arthur A. Smith
ATTORNEY Patented Oct. 23, 1951 2,572,023

UNITED STATES PATENT OFFICE 2,572,023

COAXIAL CONTROL KNOB

Vernon Goodwin, Jr., Fort Wayne, Ind., assignor to Farnsworth Research Corporation, a corporation of Indiana Application March 22, 1949, Serial No. 82,767

3 Claims. (Cl. 116—124.2)

This invention relates to manually operable control apparatus and has particular reference to adjusting knobs, especially for radio and television receivers.

In many radios and in most television receivers, the complex adjustable control apparatus thereof requires the use of a plurality of variable units, such as potentiometers and the like. These units in turn are provided with control knobs. A plurality of such knobs generally mars the appearance of a receiver cabinet. Heretofore, attempts have been made to combine some of the control units and, by a coaxial shaft arrangement, to provide each control unit with a pair of banked or nested knobs, the information regarding the function of the knobs being printed on the cabinet adjacent the control knobs. This arrangement of the identifying information is quite often misleading to the operator, since no adequate means are provided to clearly correlate the cabinet markings and the respective control knobs.

Another practice in a coaxial knob arrangement is to have one of the knobs larger than the other, each knob face being provided with an appropriate legend. Here again, the failing has been that the small knob is too small to manipulate properly, especially where accurate adjustment of the receiver is desired.

Therefore, it is an object of the invention to provide a novel coaxial arrangement of a plurality of adjusting knobs, wherein each knob thereof is substantially of the same size and each knob is provided with an integral visual identifying marking.

In accordance with this invention, there is provided a manually operable adjusting apparatus comprising a pair of indicia-carrying control knobs. One of the knobs is disposed in front of the other and has a transparent portion through which to view the indicia of the other knob.

For a better understanding of the invention, together with other and further objects thereof, reference is had to the following description, taken in connection with the accompanying drawing, and its scope will be pointed out in the appended claims.

In the accompanying drawing:

Fig. 1 is a front elevational view of a television receiver illustrating the cathode ray tube screen and the control knobs;

Fig. 2 is a side sectional view taken on line 2—2 of Fig. 1, and

Fig. 3 is an enlarged front elevational view of the coaxial control knob, illustrating the markings thereon.

Referring now to the drawing, there is illustrated a television radio receiving apparatus having a front panel 10 provided with an aperture adapted to expose the viewing screen 12 of a cathode ray tube. On the panel there is also arranged a plurality of coaxial control knobs, such as the tone and volume control knob 14. The construction of the tone and volume control knob 14, is clearly illustrated in Fig. 2.

The coaxial knob mechanism comprises a movable knob 16 secured to one end of the sleeve 18 which has its opposite end suitably connected (not shown) to a variable tone control potentiometer 20 of a unitary dual control unit 22. The knob 16 is made of opaque material. A locknut 23 rigidly supports the control unit 22 on a bracket 24 of a chassis 25.

Journaled in the sleeve 18 is a shaft 28 having one end thereof suitably connected (not shown) to a volume control and switch unit 30 of the dual control unit 22. Affixed to the outer end of the shaft 28, is a movable knob 32 having an outer annular transparent portion 34 and an inner circular opaque portion 36. The knob 32 is provided with a hub 38 to which is suitably secured the shaft 28. The knob 32 is also provided with an annular recess 40 adjacent the transparent portion 34 and in which is disposed an annular projection 42 of the knob 16. On the outer surface of the projection 42 there is etched or suitably printed, as at 44, the word "Tone" for showing the identifying information of the knob 16. The arrangement of projection 42 permits the operator to view the identifying information thereof through the transparent portion 34 of knob 32. On the circular opaque portion 36 of the translucent knob 32, there is also etched or suitably printed, the words "off"—"on" and "vol." for designating the knob 32 as the volume and switch control of the receiver.

It is thought that the operation of the control device is obvious from the foregoing description. However, it is to be observed that the device disclosed comprises two knobs, each being substantially of the same size and each having the same manual control area. This feature allows the operator to manipulate both knobs with equal facility.

Another feature of this control device is that the indicia of each knob is visible to the operator at a glance.

It is apparent that the invention may be embodied in other specific forms without departing from the spirit or essential attributes thereof, and it is desired, therefore, that the embodiments disclosed herein be considered in all respects as illustrative, reference being had to the appended claims for a determination of the scope of the invention.

What is claimed is:

1. A multi-purpose control device comprising, a pair of coaxial control knobs, a pair of coaxial shafts, a first one of said knobs being secured to one of said shafts and having a face portion carrying indicia, the second one of said knobs being secured to the other one of said shafts in front of said first knob and having an opaque portion and a transparent portion, said transparent portion affording a view of said indicia carried by said first knob, other indicia carried on said opaque portion, and a variable unitary control unit secured to said shafts and responsive to rotation of said control knobs.

2. A multi-purpose control device comprising, a pair of coaxial control knobs, a pair of coaxial shafts, a first one of said knobs being secured to one of said shafts and having a projection, the second one of said knobs being secured to the other one of said shafts and having an outer transparent portion, an inner opaque portion and also having a recess adapted to receive said projection, indicia around and on said projection adapted to be viewed through said transparent portion of said knob, other indicia on said opaque portion, and a variable unitary control unit secured to said shafts and responsive to rotation of said control knobs.

3. A multi-purpose control device for variable potentiometers and like apparatus comprising, first and second control knobs, a pair of coaxial shafts, said first knob being secured to the outer one of said shafts and having an annular projection, said second knob being secured to the inner one of said shafts in front of said first knob and having an outer annular transparent portion, an inner circular opaque portion and an annular recess adapted to receive said projection, indicia around and on the periphery of said projection adapted to be viewed through said transparent portion of said second knob, other indicia on said opaque portion, and a variable unitary control unit secured to said shafts and responsive to rotation of said control knobs.

VERNON GOODWIN, Jr.

REFERENCES CITED

The following references are of record in the file of this patent:

UNITED STATES PATENTS

| Number | Name | Date |
|---|---|---|
| 1,582,555 | Stoekle | Apr. 27, 1926 |
| 1,592,580 | Thompson | July 13, 1926 |
| 2,220,590 | Vogt | Nov. 5, 1940 |